(12) United States Patent
Bendisch et al.

(10) Patent No.: US 8,478,457 B2
(45) Date of Patent: Jul. 2, 2013

(54) FATIGUE MANAGEMENT SYSTEM

(75) Inventors: Stefan Bendisch, Munich (DE); Falk Hoffmann, Glonn (DE); Antoine Rabourdin, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 13/494,377

(22) Filed: Jun. 12, 2012

(65) Prior Publication Data

US 2012/0323410 A1  Dec. 20, 2012

(30) Foreign Application Priority Data

Jun. 17, 2011 (EP) .................................. 11400037

(51) Int. Cl.
*B64C 13/00* (2006.01)
*B60V 3/08* (2006.01)

(52) U.S. Cl.
USPC .............................. 701/3; 701/31.6; 701/120

(58) Field of Classification Search
CPC ...... B64C 1/00; B64C 1/40; B64C 3/00; B64C 5/00; B64C 7/00; B64C 9/00; B64C 11/00; B64C 13/00; B64C 15/00; B64C 17/00; B64C 19/00; B64C 25/00; B64C 27/00
USPC ............... 701/3–18, 120–122, 528; 244/1 N, 244/4 A, 4 R, 24–33, 50–52, 75.1, 76 R, 244/99.1, 99.11, 99.12, 99.13, 99.14, 900–904
See application file for complete search history.

(56) References Cited

U.S. PATENT DOCUMENTS

| | | | |
|---|---|---|---|
| 4,336,595 A * | 6/1982 | Adams et al. .................... 702/34 |
| 6,449,565 B1 * | 9/2002 | Budrow et al. .................. 702/42 |
| 6,480,792 B1 | 11/2002 | Prendergast | |
| 7,383,106 B1 * | 6/2008 | Coonse, Jr. ..................... 701/10 |
| 7,398,182 B2 * | 7/2008 | Petit ............................ 702/182 |
| 7,930,112 B2 | 4/2011 | Mattes | |
| 8,262,019 B2 * | 9/2012 | Schmidt et al. ............... 244/1 R |
| 2006/0144997 A1 * | 7/2006 | Schmidt et al. ............... 244/1 R |
| 2008/0167833 A1 | 7/2008 | Matsen | |
| 2009/0048689 A1 * | 2/2009 | Pelton et al. .................... 700/33 |
| 2009/0306839 A1 * | 12/2009 | Youngquist et al. ............ 701/14 |
| 2009/0306909 A1 | 12/2009 | Mattes | |
| 2010/0100338 A1 | 4/2010 | Vik | |
| 2010/0114411 A1 * | 5/2010 | Schmidt .......................... 701/16 |
| 2011/0046825 A1 * | 2/2011 | Lastere et al. .................. 701/16 |
| 2011/0054721 A1 * | 3/2011 | Goodrich et al. ............... 701/14 |
| 2011/0057071 A1 * | 3/2011 | Sahasrabudhe et al. ... 244/17.13 |
| 2011/0245999 A1 * | 10/2011 | Kordonowy ...................... 701/3 |

FOREIGN PATENT DOCUMENTS

DE       4336588 A1     5/1995
DE   102005018123 A1    10/2006

OTHER PUBLICATIONS

Search Report and Written Opinion; Application No. EP 11400037; dated Dec. 15, 2011.

* cited by examiner

*Primary Examiner* — Mary Cheung
*Assistant Examiner* — Atul Trivedi
(74) *Attorney, Agent, or Firm* — Brooks Kushman P.C.

(57) ABSTRACT

A fatigue management system for determining the individual life of an aircraft, particularly the individual life of components of a helicopter, by means of an on board virtual load sensor and a method of operating a fatigue management system.

7 Claims, 3 Drawing Sheets

FATIGUE MANAGEMENT SYSTEM

CROSS REFERENCE TO RELATED APPLICATIONS

This application claims priority to European patent application no. EP 11 400037.5 filed Jun. 17, 2011, the disclosure of which is incorporated in its entirety by reference herein.

BACKGROUND OF THE INVENTION (1) Field of the Invention

The invention relates to a fatigue management system and a method of operating a fatigue management system.

(2) Description of Related Art

Components of helicopters or fixed wing aircrafts have a limit service life to maintain operational safety, said service life limit (SLL) or component retirement time (CRT) being evaluated during load classification flights of e.g. a model of the helicopter. Said service life limit is adapted to several mission profiles while taking into account redundancy and safety assumptions. For customers having helicopters or fixed wing aircrafts not flying any of these mission profiles any service life limit of components may not be exhausted even though due to the standards of the evaluation said components have to be serviced.

The document DE 4336588 A1 discloses a method for determining the individual life of an aircraft by means of a plurality of neural networks for flight attitudes, centres of gravity and weights and their sequences in time, which are linked to one another and whose results are stored in an on-board black box, as well as being entered in an external ground station for detailed determination of the current individual life and the individual maintenance intervals.

The document U.S. Pat. No. 6,480,792 B1 discloses a fatigue monitoring system and method, in which a stream of data relating to the stresses experienced at a plurality of locations over the structure during operation is applied to a ground based neural network trained to remove data stream values deemed to be in error. The stresses are either signalled by a plurality of sensors disposed at different locations in said structure or said stresses are calculated by comparison with a large number of templates, said templates being derived from finite element analysis and the results of ground based airframe fatigue tests. The data from the neural network is then processed to determine the fatigue life.

The document U.S. Pat. No. 4,336,595 A discloses an electronic device which determines the fatigue life of a structure and its crack growth characteristics when subjected to repeated loading by using the signal from an electrical resistance type strain gage secured to the structure to provide the input to a processor which monitors cyclic excursions, calculates the fatigue and fracture structural damage from those excursions, stores the cumulative damage, and displays that damage on command The document US2010100338 A1 discloses a monitoring system, which may include a structural component configured to undergo mechanical loading and a wireless node attached to the structural component. The node may include a strain sensing device configured to measure strain experienced by the structural component at the location of the node. The node may also include a processor configured to predict, based on the strain measurements, fatigue life of the structural component The document US2008167833 A1 discloses methods and systems for structural and component health monitoring. A system includes a plurality of sensor systems positioned about an object to be monitored and a processing system communicatively coupled to at least one of said plurality of sensor systems wherein the processing system includes an ontology and reasoning module configured to model the object to be monitored, reason about the received sensor data associated with the object to be monitored and reason about the relationships between the received sensor data to fuse the data into contextual information for the overall object to be monitored and a contextual analyzer configured to transmit the received sensor data to said ontology and reasoning module and to store the information into a contextual information database.

The document US2009306909 A1 discloses a method for the evaluation of measured values for the recognition of defect conditions due to material fatigue on aircraft parts, in which strain sensors are applied on the critical locations of an aircraft or the parts thereof, wherein the measured values of the strain sensors at different loading conditions are detected, amplified and stored through several measuring circuits and from which an evaluating apparatus derives, signals or indicates a material fatigue by comparison of current measured values with previous measured values. Critical aircraft parts are impinged on with a plurality of prescribed loading conditions by a plurality of loading elements. The strain effect caused thereby is detected by a plurality of measuring circuits, and the evaluating apparatus forms, for at least each loading condition and each measuring circuit, an allocated reference value and a permissible limit value range, which is subsequently coupled with the current measured values in such a manner so that the exceeding of the limit value range represents a material fatigue manifestation.

BRIEF SUMMARY OF THE INVENTION

One objective of the invention is to provide a fatigue management system allowing improved knowledge of in-flight loads on helicopter components and a method for operating such a fatigue management system.

The solution is provided with a fatigue management system with the features of claim 1 and a method for operating said fatigue management system with the features of claim 6.

According to the invention a fatigue management system is provided for determining the individual life of an aircraft in terms of a reconstructed continuous load history, particularly the individual life of components of a helicopter. An on board virtual load sensor of said fatigue management system comprises at least one data storage with load data detected at predetermined locations of the aircraft and associated to respective causative operational conditions due to pilot input parameters collected during classification flight surveys. Control means for at least one input for a pilot's parameters and correlation means such as recording means are provided for recording said parameters with a specific sampling frequency. For example at least one processor correlates the parameters supplied by said pilot via the control means to the load data in said at least one storage. The inventive system is able to recognize applied loads during flight on different component assemblies from analyzing flight parameters for maintenance credit purposes. Thus, it acts as a virtual load sensor on an arbitrary amount of positions. Loads will not be measured directly by on board sensors; instead real load data from classification flight load surveys are taken into account and are related directly to the pilot's input parameters. The inventive system as part of a modern "Health & Usage Monitoring System (HUMS)" with a Condition Based Maintenance (CBM) option allows Service Life Limit Extension/ Maintenance Credits for Helicopter components, where qualification flight data is available without load sensors installed inside the aircraft to be assessed. Additionally, the complete load history of an aircraft at an arbitrary number of locations is available after flight. This omits the separation of high frequency and "Ground-Air-Ground (GAG)" loads contrary to the necessities of state of the art load estimation techniques, since no continuous load history is estimated. The obtained continuous load history from the virtual load sensor of the inventive system can be processed further to obtain the fatigue consumption of all supervised components. Certification of the inventive system is advantageously possible with conservative assumption during load regime classifications while maintaining adjustable recognition rates by means of safety factor integration during load recognition in contrast to flight regime recognition where the most severe flight regime has to be picked. A further advantage of the inventive system is improved safety due to its effect as a human error filter due to network training on corresponding loads from in-flight measurements. The inventive fatigue management system is independent from pilot variance (human error) in contrast to dependent flight regime recognition which contains pilot variations and relies on non exact flight regime definitions, said dependent flight regime recognition therefore being inaccurate and requiring additional conservatism. Design of components may be optimized due to load analysis on each assembly by means of the inventive fatigue management system.

According to a preferred embodiment of the invention at least one neural network is trained on measured loads during at least one load qualification flight at a plurality of locations over said aircraft during operation. Said measured loads are related to flight parameters acquired from said at least one load qualification flight. The inventive system comprises data storage means for storing said measured loads related to flight parameters and detection means for recognizing any of said acquired flight parameters. A pilot's inputs during flight are related to said acquired flight parameters and corresponding loads are retrieved from the neural network for improved evaluation of consumed lifetime of any of the components of the aircraft. Flight parameters, such as aircraft roll, pitch and yaw angles and velocities, A/C speed, acceleration, engine torques, altitude and pilot stick/pedal inputs are used for neural network input for association with loads for higher reliability and accuracy. The association of flight parameters and load classes can be seen as accurate due to the high amount of possibilities and their heuristic linkage by the neural network during training. Any actual operating condition is associated with the "closest" trained operating condition in terms of said flight parameters. If a "new" operation condition is present during flight, the neural network will associate loads to the closest existing operation condition due to its heuristic character.

According to a further preferred embodiment of the invention said at least one processor comprises said neural network for associating any pilot's real time input to the load data detected at the predetermined locations of the aircraft at associated pilot input parameters collected during said at least one load qualification flight.

According to a further preferred embodiment of the invention said at least one data storage is adapted to store a load history of a predetermined number of locations of the aircraft data.

According to a preferred embodiment of the invention a method for operating a fatigue management system relates a stream of flight data to loads experienced at a plurality of locations using heuristic algorithms, particularly a neural network. Said heuristic algorithm is trained using certification flight load survey data and flight parameters from real measurement data. Any output of said heuristic algorithm corresponds to loads occurred during flight load surveys which are used for component service life determination under current state of the art methods. Flight parameters are pre-processed using moving average, calculating means and gradient values and said flight parameters subsequently are processed within a sequence, which is a definite period of time and/or number of samples. Output loads are given in mean, amplitude and frequency values to allow complete reconstruction of the load history. Arithmetic mean, amplitude and frequency of the loads are grouped in categories (nominal values) instead of continuous values and minimum/maximum values of the load categories are used to reconstruct the load history. An intermediate result is the load history per dedicated component/location. Arithmetic mean, amplitude and frequency values of calculated loads are processed to determine a rainflow matrix for each dedicated location. Processing of the obtained load history is done by a range-pair-range algorithm and a cumulated fatigue is calculated using said rainflow-matrix to determine the actual component usage during flight. Any damage per dedicated component/location is calculated during flight. This inventive method does not depend on any defined flight regime of the pilot, since it relies completely on in-flight parameters and its corresponding loads. The problem of any missing flight definitions will become obsolete to simplify the qualification process for maintenance credits of aircrafts. Real load data is used for input parameter association. Loads measured during certification flight load surveys are accepted by means of fatigue calculation by the authorities. All operating conditions from the load classification mission profile are represented, such as emergency and rare operation conditions. If a "new" operation condition is present during flight, the neural network will associate loads to the closest existing operation condition.

BRIEF DESCRIPTION OF THE SEVERAL VIEWS OF THE DRAWINGS

A preferred embodiment of the invention is described by way of the annexed drawings.

DETAILED DESCRIPTION OF THE INVENTION

Figure 1:
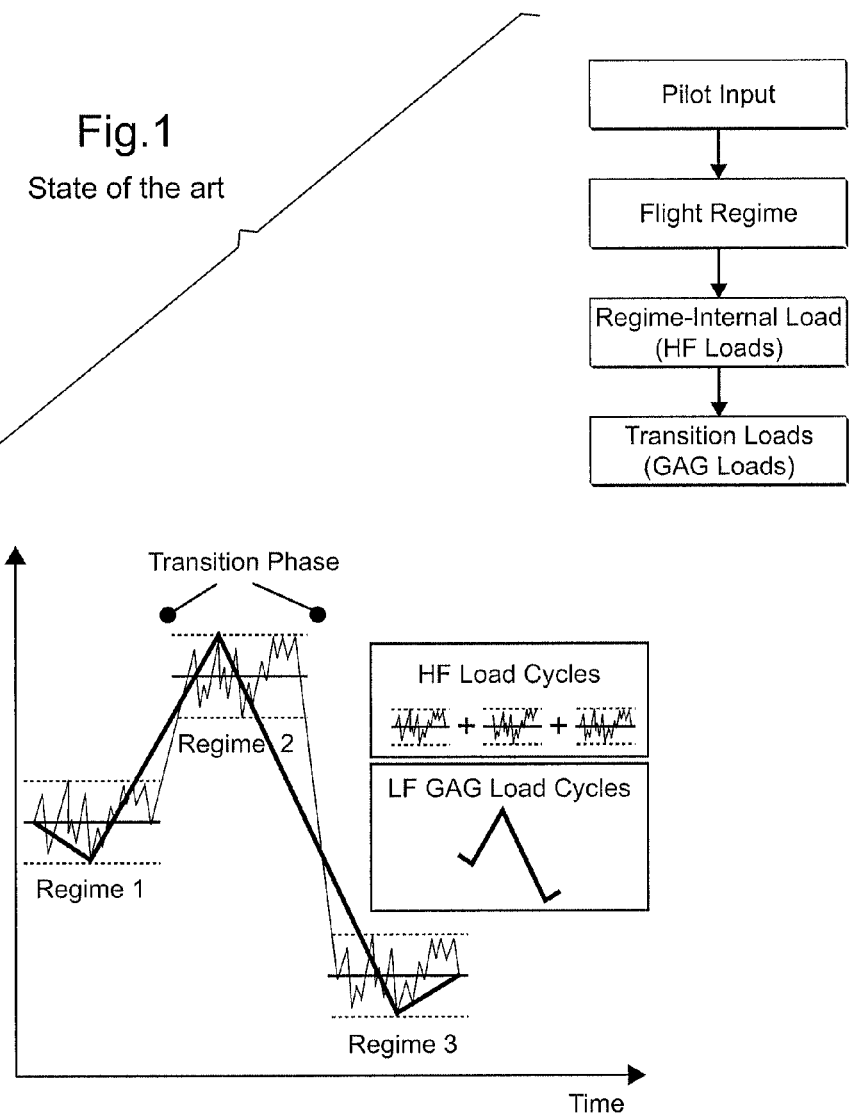
FIG. 1 shows a chart for an in flight load estimation system according to a state of the art.

According to FIG. 1 a load estimation during flight according to a state of the art, which associates flight regimes and its sequence with loads, is done indirectly by recognizing the occurring flight regimes subsequent to pilot inputs to control means of an aircraft. The flight regime is associated with determined loads which will be used for fatigue estimation. The determined loads rely on flight load survey measurements and are referred to as high frequency (HF) loads. Transitions from one flight regime to another are called GAG-loads. The load history of the entire flight is estimated on basis of the flight regimes which take regime-internal HF loads and regime transition GAG loads into account.

Figure 2:
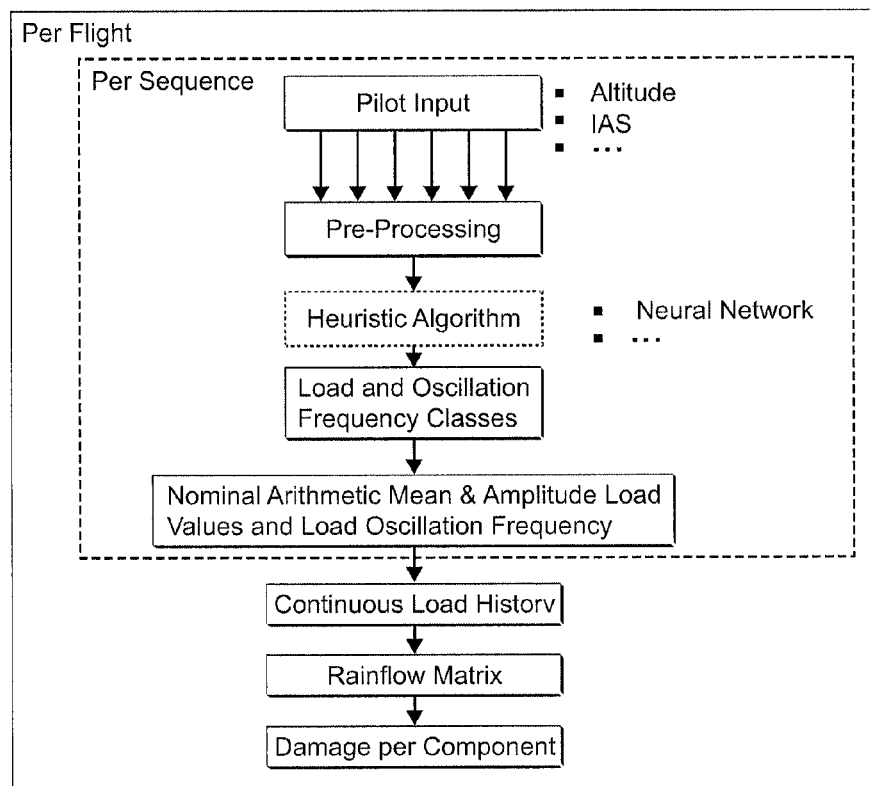
FIG. 2 shows a chart for a system according to the invention.

According to FIG. 2 a fatigue management system is part of a modern "Helicopter Universal Management System (HUMS)" (not shown) with a "Condition Based Maintenance (CBM)" option for helicopters.

The fatigue management system is conceived as a plurality of on board virtual load sensors. The virtual load sensor relies on real sensor data measured during load classification flights. There are about 40 sensor locations inside and outside a helicopter during load classification flights. The loads at said about 40 sensor locations during load classification flights are acquired simultaneously with associated pilot input parameters. The associated pilot input parameters are used to link the flight parameters, such as airspeed, pitch/roll angles, etc., to the loads measured on each of said locations. For instance, critical parts for maintenance of the helicopter may be equipped with load sensors during classification flights and the load data detected by said load sensors are stored. The helicopter's pilot input parameters and the flight parameters associated to said load data are measured and stored in parallel at "Pilot Input".

The on board virtual load sensor comprises the correlation of these load data and input parameters recorded during said classification flights with a specific sampling frequency. Each sequence (time span) the input parameters are pre-processed by means of arithmetic mean and gradient calculation at "Pre-Processing". During training with measured load classification data, load classes are derived using minimum and maximum value of the acting force. Those load classes are heuristically linked to the combination of pre-processed input parameter values using neural networks at "Heuristic Algorithm". Per aircraft, all load classification flights are used for a reliable association/correlation of pre-processed input parameters and load classed per sequence of the neural network.

At "Load and Oscillation Frequency Classes" these load data and input parameters are processed by an adequate association algorithm like a neural network for definition of specific load classes in the on board virtual load sensor. Said load classes are used to determine minimum, maximum, mean and amplitude values for any acting forces. Additionally the major load oscillation frequency is processed by said association algorithm. This frequency is determined by association during said classification flights via Fourier transform for each component individually. Mean and amplitude load and oscillation frequency processed at "Nominal Arithmetic Mean & Amplitude Load Values and Load Oscillation Frequency" are used for continuous load history reconstruction at "Continuous Load History".

In a corresponding helicopter but without real load sensors the pilot's inputs are directly linked to said on board virtual load sensor comprising the acquired load data and associated input parameters. The pilot's real time inputs are supplied to and associated in said on board virtual load sensor and respective specific load classes are derived from said pilot's inputs out of the acquired load data at "Rainflow Matrix". Even small input deviations from an associated regime will lead to an accurate continuous load history, because any input difference will be recognized by the virtual load sensor computing directly loads occurring in-flight for service life limit extension and/or maintenance credits evaluation of service life limit helicopter components on a basis of accurate service life limit analysis for maintenance reduction allowing accurate analysis of e.g. a customer mission profile and maintenance/overhaul process for individual maintenance concept for a customer at "Damage per Component".

Figure 3:
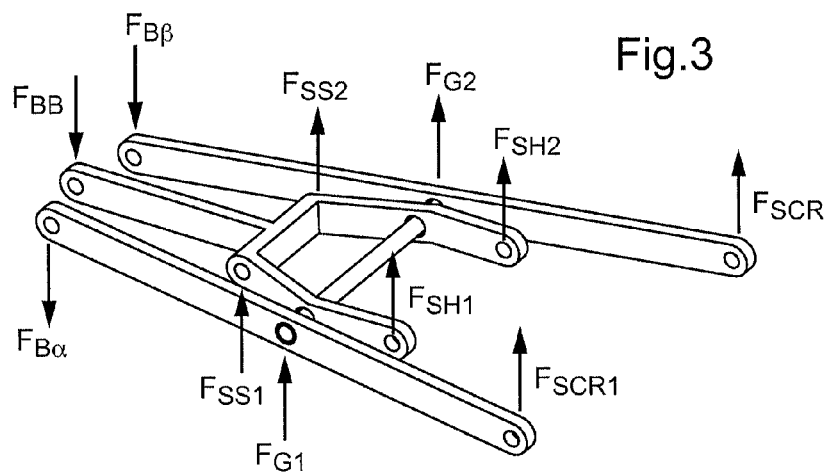
FIG. 3 shows a sample for measurement points of the invention.

According to FIG. 3 measurement points F of the fatigue management system at a mixing lever unit 10 for a main rotor booster (not shown) are basis of individual load class generation from load classification flights. The individual loads are measured during load classification flights by means of strain gages.

Figure 4:
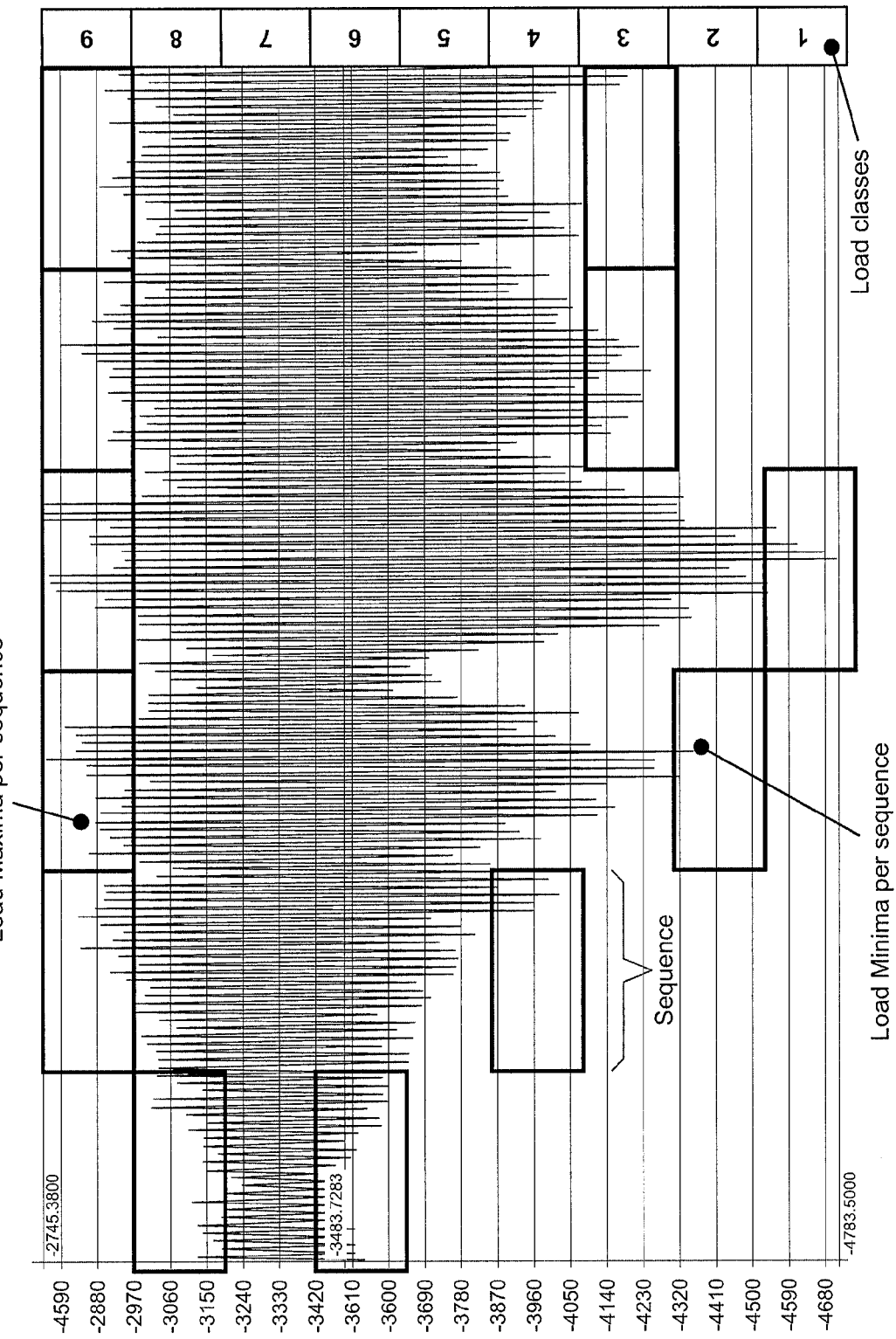
FIG. 4 shows a graph of measured loads with superposed load classes according to the invention.

According to FIG. 4 a graph of measured loads is subdivided with superposed load classes according to a predetermined sequence.

What we claim is:

1. A fatigue management system for determining the individual life of an aircraft, particularly the individual life of components of a helicopter, by an on board virtual load sensor comprising:
    at least one data storage with load data detected by on board real load sensors during at least one precedent load classification flight at predetermined locations of the aircraft and associated to respective causative operational conditions due to pilot input parameters collected during said classification flights;
    control means for at least one input for a pilot's parameters to operate said aircraft subsequent to said classification flights; and
    correlation means for said pilot's parameters to directly link, without use of real load sensors, the pilot's input to said on board virtual load sensor to associate said pilot's parameters and related flight parameters via the respective causative operational conditions collected during said classification flights to the corresponding load data from the at least one precedent load classification flight.

2. The system according to claim 1, wherein at least one neural network is provided said at least one neural network being trained on measured loads during load qualification flights at a plurality of locations over said aircraft during operation, said measured loads being related to flight parameters acquired from said at least one load qualification flight, said system comprising said at least one data storage means for storing said measured loads related to flight parameters and detection means for recognizing any of said flight parameters, the load corresponding to any of said flight parameters being retrieved from the at least one neural network for evaluation of consumed lifetime of any components of the aircraft.

3. The system according to claim 2, wherein at least one processor is provided, said at least one processor comprises said neural network for associating the pilot's real time input to the load data detected at the predetermined locations of the aircraft at associated pilot input parameters collected during load classification flight.

4. The system according to claim 1, wherein said at least one data storage is adapted to store a load history of a predetermined number of locations of the aircraft data.

5. The system according to claim 1, wherein recording means are provided to record said parameters with a specific sampling frequency.

6. A method for relating a stream of flight data of an aircraft to loads experienced at a plurality of locations of the aircraft, the method comprising the steps of:
    storing load data detected by on board real load sensors during at least one precedent load classification flight at predetermined locations of an aircraft and associated to respective causative operational conditions due to pilot input parameters collected during said classification flights;
    receiving at least one input for a pilot's parameters to operate the aircraft subsequent to said classification flights;
    correlating the pilot's parameters to directly link, without use of real load sensors, the pilot's input to an on board virtual load sensor to associate the pilot's parameters and related flight parameters via the respective causative operational conditions collected during said classification flights to the corresponding load data from the at least one precedent load classification flight;

training a heuristic algorithm using classification flight data and the flight parameters from the load data detected with the real sensors;

pre-processing the flight parameters using moving average and calculating mean and gradient values within a sequence, which is a definite period of time/number of samples;

grouping minimum, maximum and oscillation frequency values of the loads in categories of nominal values instead of continuous values;

associating pre-processed flight parameters with dedicated load classes and oscillation frequency of said categories using said heuristic algorithm;

reconverting associated nominal load classes to continuous minimum and maximum load values per sequence;

giving output loads in minimum, maximum and oscillation frequency values allowing to reconstruct a complete load history;

processing minimum and maximum values of the loads to determine arithmetic mean and amplitude load values;

using minimum/maximum and oscillating frequency values represented in the load categories to reconstruct the load history;

processing arithmetic mean, amplitude and frequency values of calculated loads to determine a rainflow matrix for each dedicated location by range-pair-range algorithm;

calculating cumulated fatigue using the rainflow-matrix to determine the actual component usage during flight; and calculating any damage per dedicated component / location during flight.

7. A fatigue management system for determining the individual life of components of an aircraft by a virtual load sensor on board the aircraft, the virtual load sensor comprising;

a data storage with load data detected by real load sensors on board a classification aircraft at predetermined locations of the classification aircraft during at least one precedent load classification flight of the classification aircraft and associated to respective causative operational conditions due to pilot input parameters collected during the classification flights;

control means for at least one pilot input to operate the aircraft; and correlation means to directly link, without the use of real load sensors, the at least one pilot input to the virtual load sensor to associate the pilot input parameters and related flight parameters via the respective causative operational conditions collected during the classification flights to the corresponding load data from the at least one precedent load classification flight.

* * * * *